United States Patent
Park et al.

(10) Patent No.: US 9,465,263 B2
(45) Date of Patent: Oct. 11, 2016

(54) LIQUID CRYSTAL DISPLAY DEVICE HAVING AN OVERLAPPING PIXEL ELECTRODE AND DATA LINE

(71) Applicant: Samsung Display Co., Ltd., Yongin (KR)

(72) Inventors: Kee Bum Park, Cheonan-si (KR); Kyung Ho Kim, Seongnam-si (KR); Hyung Jin Song, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 37 days.

(21) Appl. No.: 14/538,537

(22) Filed: Nov. 11, 2014

(65) Prior Publication Data

US 2016/0033830 A1 Feb. 4, 2016

(30) Foreign Application Priority Data

Jul. 29, 2014 (KR) .................. 10-2014-0096621

(51) Int. Cl.
*G02F 1/1343* (2006.01)
*G02F 1/1337* (2006.01)
*G02F 1/1362* (2006.01)
*G02F 1/1368* (2006.01)
*G02F 1/1335* (2006.01)

(52) U.S. Cl.
CPC ....... *G02F 1/134336* (2013.01); *G02F 1/1368* (2013.01); *G02F 1/133514* (2013.01); *G02F 1/136286* (2013.01); *G02F 2001/136222* (2013.01)

(58) Field of Classification Search
CPC .................. G02F 1/134336; G02F 1/133707; G02F 1/1339; G02F 1/134309; G02F 1/134363; G02F 1/1393; G02F 2001/133742; G02F 1/133753
USPC ......................................... 349/130, 146, 144
See application file for complete search history.

(56) References Cited

U.S. PATENT DOCUMENTS 9,213,209 B2 * 12/2015 Chang ...................... G02F 1/139
2010/0001276 A1 * 1/2010 Kim .................. G02F 1/136227
257/59
2013/0194536 A1 * 8/2013 Tae .................... G02F 1/133707
349/143

FOREIGN PATENT DOCUMENTS

KR 10-2007-0028084 3/2007
KR 10-2012-0090888 8/2012
KR 10-2013-0034360 4/2013

* cited by examiner

*Primary Examiner* — Mike Qi
(74) *Attorney, Agent, or Firm* — H.C. Park & Associates, PLC

(57) ABSTRACT

A liquid crystal display device includes a first substrate, a gate line disposed on the first substrate, a data line disposed on the first substrate and intersecting the gate line, and a pixel electrode disposed in a pixel region at least partially defined by the gate line and the data line, and overlapping the data line, the pixel electrode including first and second sub-pixel electrodes separated from each other. Each of the first and second sub-pixel electrodes includes a horizontal stem extending in a direction intersecting the data line, and branches connected to the horizontal stem.

18 Claims, 5 Drawing Sheets

LIQUID CRYSTAL DISPLAY DEVICE HAVING AN OVERLAPPING PIXEL ELECTRODE AND DATA LINE

CROSS-REFERENCE TO RELATED APPLICATION

This application claims priority from and the benefit of Korean Patent Application No. 10-2014-0096621, filed on Jul. 29, 2014, which is hereby incorporated by reference for all purposes as if fully set forth herein.

BACKGROUND

1. Field

Exemplary embodiments of the present invention relate to a liquid crystal display device.

2. Discussion of the Background

A liquid crystal display (LCD) device, which is a type of flat panel display device, includes two display panels on which field-generating electrodes such as pixel electrodes and a common electrode are formed, and a liquid crystal layer which is interposed between the two display panels. The LCD device generates an electric field in the liquid crystal layer by applying a voltage to the field-generating electrodes. In this manner, the LCD device determines the orientation of liquid crystal molecules in the liquid crystal layer, and controls the polarization of incident light, thereby displaying an image.

A vertically aligned mode LCD device, which is a type of LCD device, has been developed. In the vertically aligned mode LCD device, liquid crystal molecules are vertically aligned with respect to display panels when no electric field is applied.

It is important for the vertically aligned mode LCD device to secure wide viewing angles, and for this reason, incisions such as fine slits or protrusions may be formed on the field-generating electrodes of the vertically aligned mode LCD device. The incisions or the protrusions determine the tilt direction of liquid crystal molecules. The viewing angle of the vertically aligned mode LCD device may be widened by appropriately distributing the incisions or the protrusions so as to diversify the tilt direction of liquid crystal molecules.

However, the formation of incisions, such as fine slits, may result in irregular texture in areas (such as along the sides of a pixel region) that may not be affected by members for determining the tilt direction of liquid crystal molecules. As a result, the display quality of the vertically aligned mode LCD device may deteriorate.

The above information disclosed in this Background section is only for enhancement of understanding of the background of the present invention, and, therefore, it may contain information that does not form the prior art that is already known in this country to a person of ordinary skill in the art.

SUMMARY

Exemplary embodiments of the present invention provide a liquid crystal display (LCD) device capable of preventing the display quality thereof from deteriorating due to irregular texture.

Additional aspects of the present invention will be set forth in the detailed description which follows, and, in part, will be apparent from the disclosure, or may be learned by practice of the present invention.

An exemplary embodiment of the present invention discloses a liquid crystal display device including at least one gate line configured to be disposed on a first substrate and at least one data line configured to intersect the gate line; and a pixel electrode configured to be disposed in a pixel region defined by the gate line and the data line and including first and second sub-pixel electrodes, which are isolated from each other, wherein each of the first and second sub-pixel electrodes includes a horizontal stem extending in a direction intersecting the data line and a plurality of branches connected to the horizontal stem and the pixel electrode overlaps with the data line.

An exemplary embodiment of the invention also discloses a liquid crystal display device including a first substrate; at least one gate line configured to be disposed on the first substrate; at least one first data line and at least one second data line configured to be disposed on the first substrate, to be insulated from the gate line and to intersect the gate line; a first thin-film transistor (TFT) configured to be connected to the gate line and the first data line; a second TFT configured to be connected to the gate line and the first data line; a pixel electrode including first and second sub-pixel electrodes, which are connected to the first and second TFTs, respectively; a second substrate configured to face the first substrate; a common electrode configured to be disposed on the second substrate; and a liquid crystal layer configured to be disposed between the first and second substrates, wherein the pixel electrode overlaps with the first data line at one side thereof and overlaps with the second data line at another side thereof.

According to the exemplary embodiments of the present invention, it is possible to provide a liquid crystal display device capable of not only preventing the display quality from deteriorating due to irregular texture, but also improving the display quality.

It is to be understood that both the foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the present invention, and are incorporated in and constitute a part of this specification, illustrate exemplary embodiments of the present invention, and, together with the description, serve to explain principles of the present invention.

DETAILED DESCRIPTION OF THE ILLUSTRATED EMBODIMENTS

Figure 1:
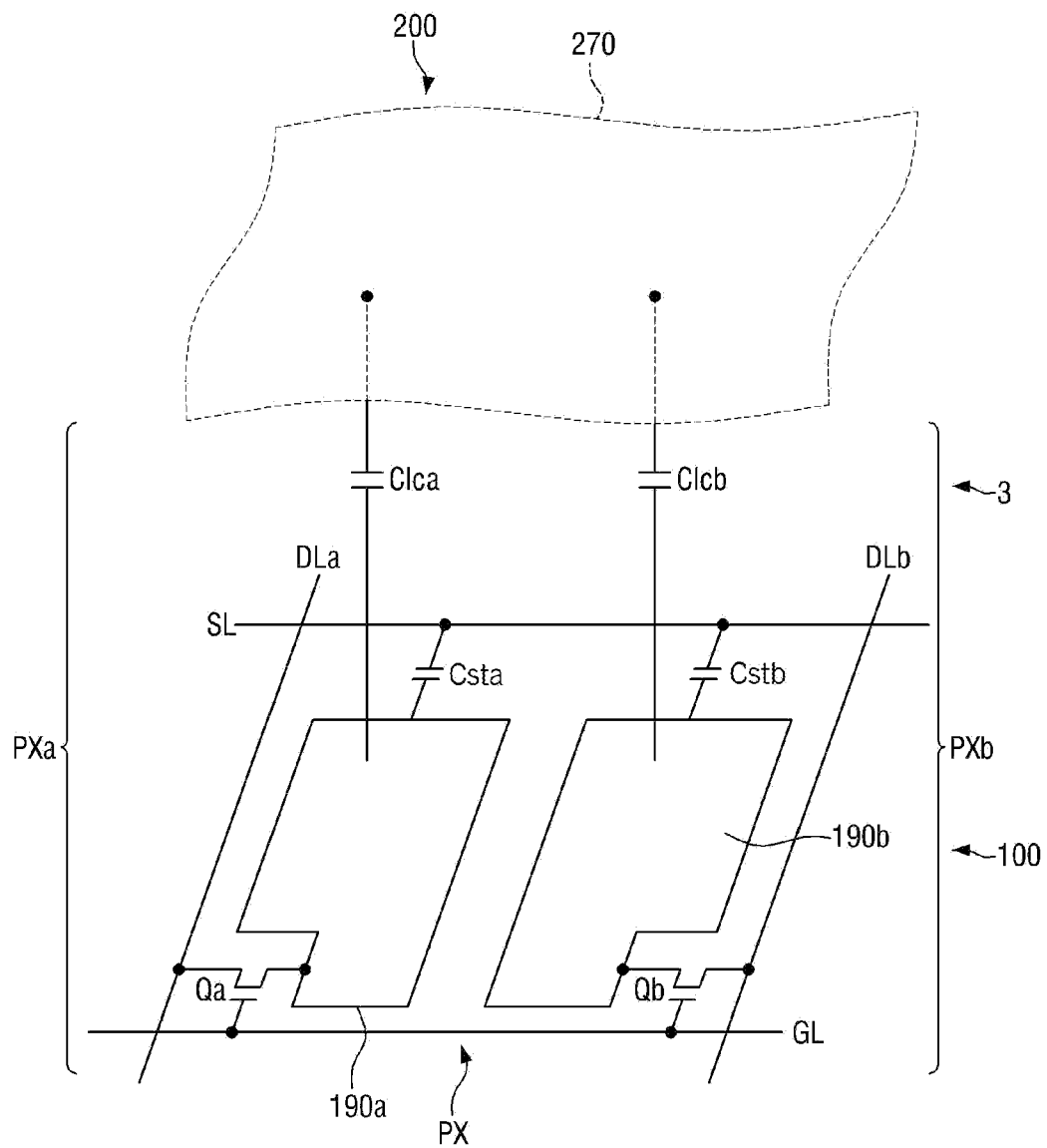
FIG. 1 is a schematic diagram of a pixel of a liquid crystal display (LCD) device according to an exemplary embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic diagram of a pixel of a liquid crystal display (LCD) device according to an exemplary embodiment of the present invention.

Referring to FIG. 1, an LCD device according to an exemplary embodiment of the present invention may include a first display panel 100 and a second display panel 200 facing each other and a liquid crystal layer 3 disposed between the first display panel 100 and the second display panel 200. The LCD device may also include a backlight unit (not illustrated) disposed at the bottom of the first display panel 100 or at the top of the second display panel 200.

The first display panel 100 may include a plurality of signal lines, including a plurality of gate lines GL, a plurality of pairs of data lines DLa and DLb, and a plurality of sustain electrode lines SL, and a plurality of pixels PX connected to the plurality of signal lines.

Each of the pixels PX may include a pair of sub-pixels PXa and PXb. The sub-pixels PXa and PXb may include switching devices Qa and Qb, respectively, liquid crystal capacitors Clca and Clcb, respectively, and storage capacitors Csta and Cstb, respectively.

Each of the switching devices Qa and Qb may be implemented as a three-terminal switching device such as a thin-film transistor (TFT) provided on the first display panel 100. The gate terminals of the switching devices Qa and Qb may be connected to a gate line GL, the input terminals of the switching devices Qa and Qb may be connected to a pair of data lines DLa and DLb, respectively, and the output terminals of the switching devices Qa and Qb may be connected to the liquid crystal capacitors Clca and Clcb, respectively, and the storage capacitors Csta and Cstb, respectively.

The liquid crystal capacitors Clca and Clcb may be formed to have first and second sub-pixel electrodes 190a and 190b, respectively, of the first display panel 100 as first terminals thereof, have a common electrode 270 of the second display panel 200 as second terminals thereof, and have liquid crystal molecules of the liquid crystal layer 3 as dielectric bodies thereof.

The storage capacitors Csta and Cstb, which serve as auxiliary liquid crystal capacitors, may be formed by a sustain electrode line SL, which is provided on the first display panel 100, the first and second sub-pixel electrodes 190a and 190b, which overlap with the sustain electrode line SL with a dielectric body interposed therebetween. A uniform voltage such as a common voltage may be applied to the sustain electrode line SL.

The liquid crystal capacitors Clca and Clcb may be set to be charged with slightly different voltages. For example, a data voltage applied to the liquid crystal capacitor Clca may be set to be higher or lower than a data voltage applied to the liquid crystal capacitor Clcb. By appropriately adjusting the voltages of the liquid crystal capacitors Clca and Clcb, an image that can be viewed from a side of the LCD display device may become as similar as possible to an image that can be viewed in front of the LCD display device, and as a result, the lateral visibility of the LCD device may be improved.

The common electrode 270 is illustrated in FIG. 1 as being provided on the second display panel 200. The common electrode 270 may alternatively be provided on the first display panel 100.

The LCD device according to an exemplary embodiment of the present invention will hereinafter be described in further detail with reference to FIGS. 2 to 5.

Figure 2:
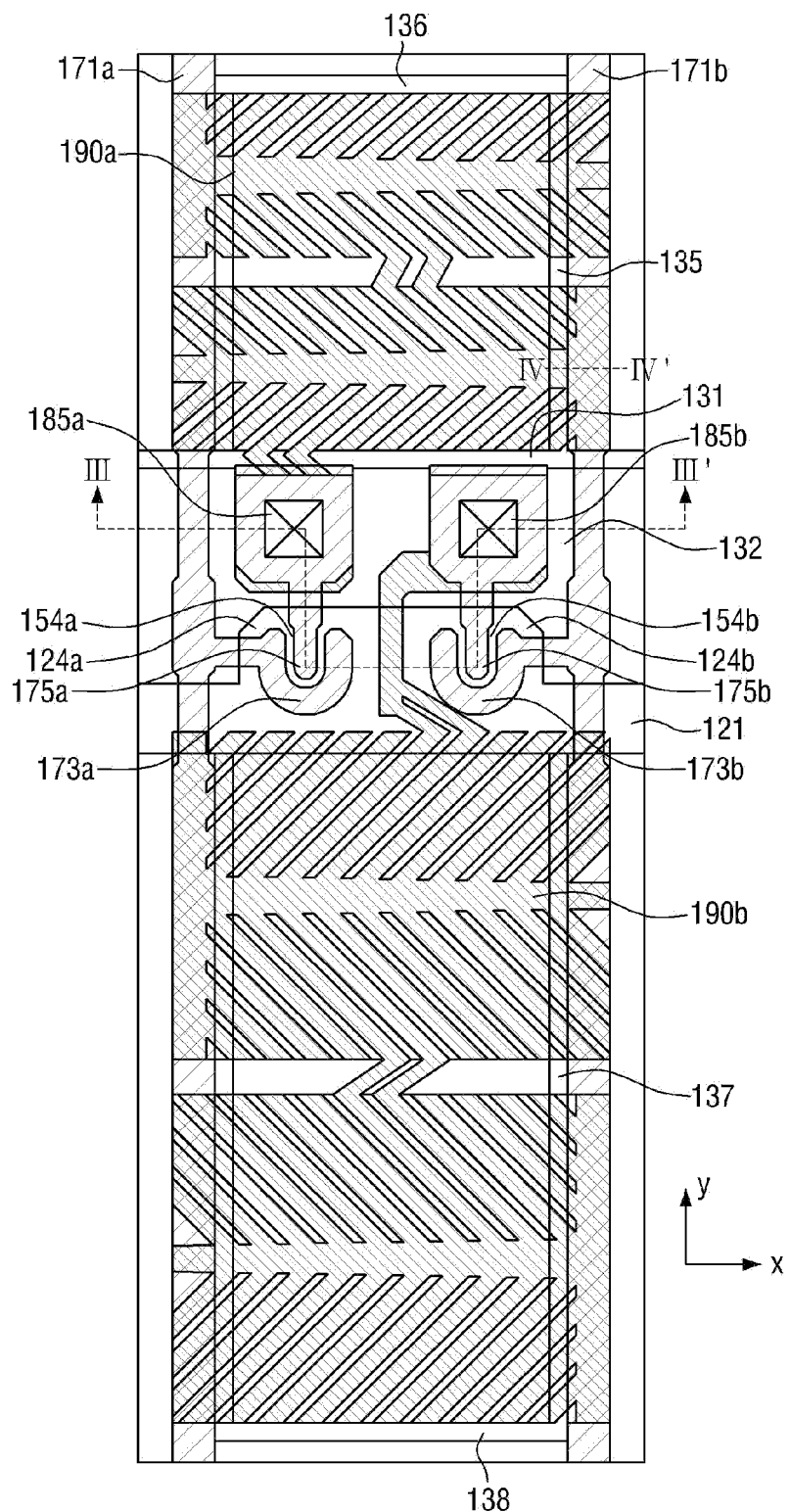
FIG. 2 is a layout diagram of the LCD device.
Figure 3:
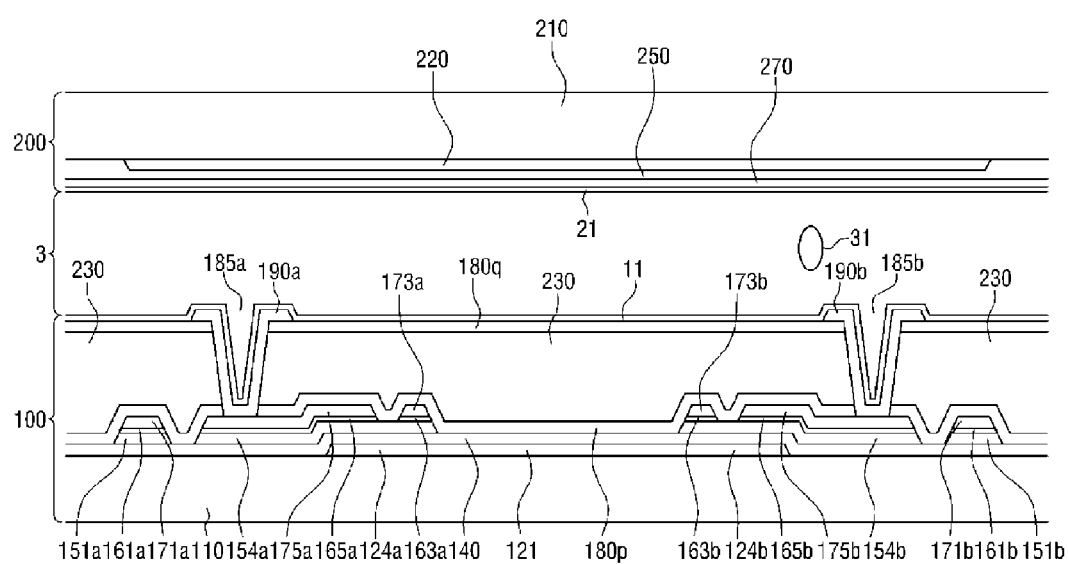
FIG. 3 is a cross-sectional view of the LCD device, taken along line III-III of FIG. 2.
Figure 4:
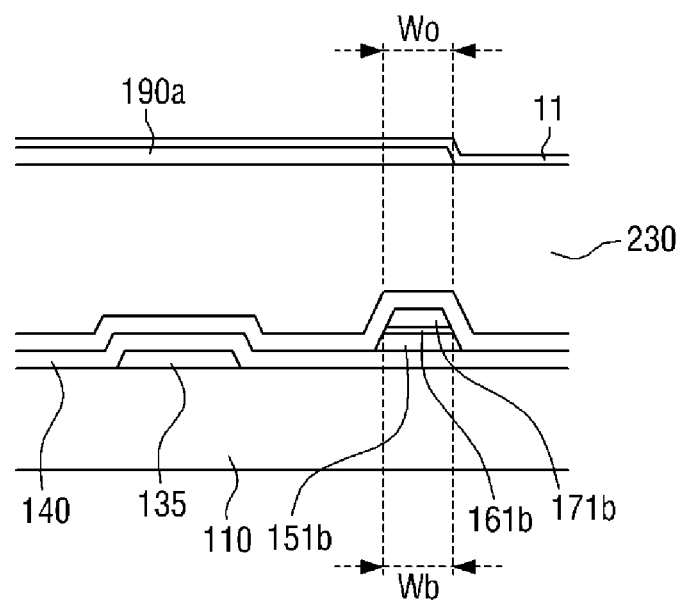
FIG. 4 is a cross-sectional view of the LCD device, taken along line IV-IV of FIG. 2.
Figure 5:
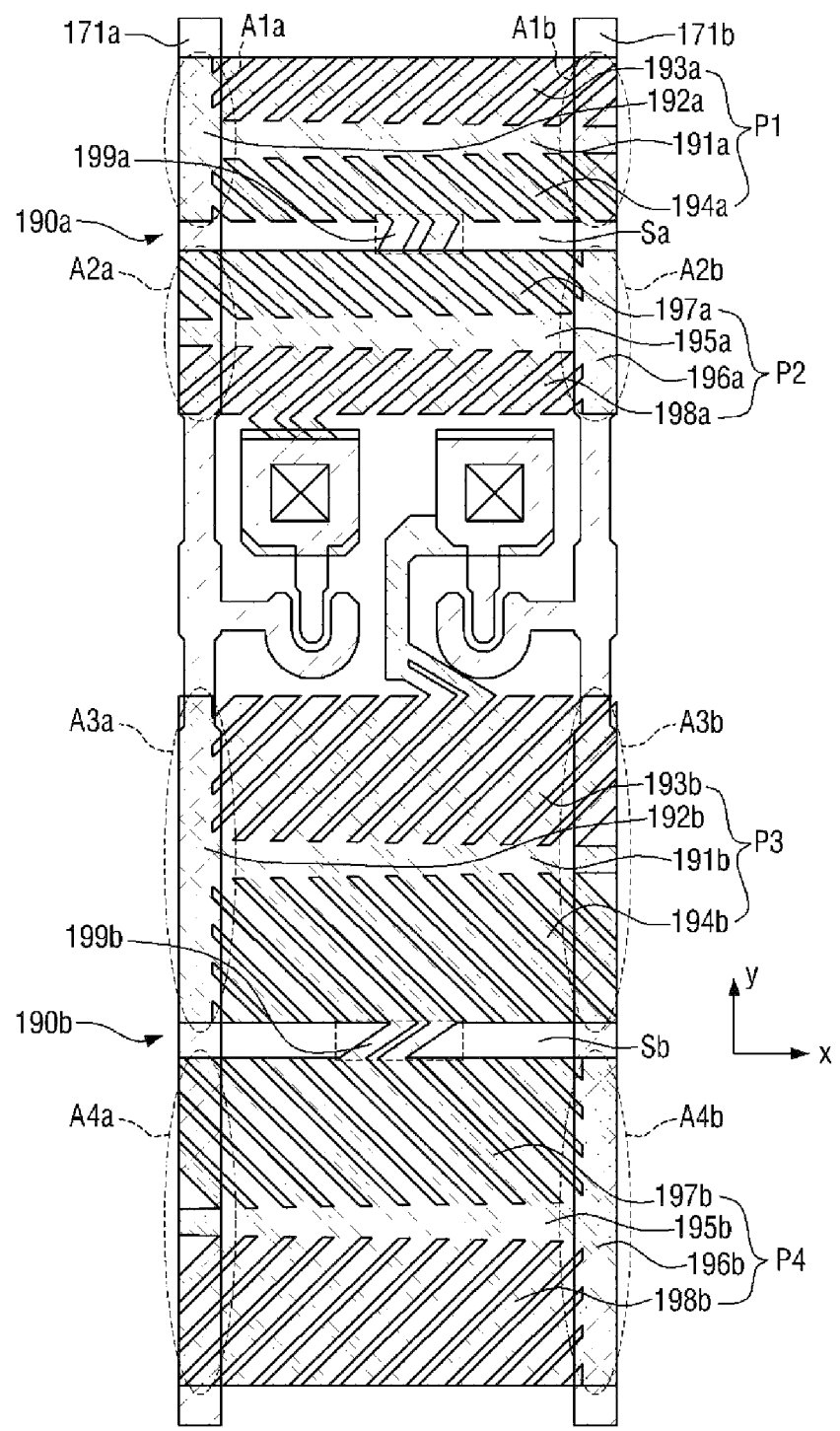
FIG. 5 is a layout diagram illustrating the structure of a pixel electrode of the LCD device and the relationship between the pixel electrode and a pair of data lines.

FIG. 2 is a layout diagram of the LCD device according to an exemplary embodiment of the present invention, FIG. 3 is a cross-sectional view taken along line III-III of FIG. 2, FIG. 4 is a cross-sectional view taken along line IV-IV of FIG. 2, and FIG. 5 is a layout diagram illustrating the structure of a pixel electrode of the LCD device of FIG. 2 and the relationship between the pixel electrode and a pair of data lines.

Referring to FIGS. 2 to 4, the LCD device includes the first display panel 100, the second display panel 200, and the liquid crystal layer 3 interposed between the first display panel 100 and the second display panel 200.

The first display panel 100 will hereinafter be described.

A gate line 121, a storage electrode line 131 and sustain electrodes 135, 136, 137, and 138 may be disposed on a first substrate 110, which is formed of an insulating material, such as transparent glass or a plastic material.

The gate line 121 transmits a gate signal, and extends mostly in a horizontal direction (an X-axis direction). The gate line 121 may include a plurality of first and second gate electrodes 124a and 124b, which protrude upwardly (a Y-axis direction).

The sustain electrode line 131 may be formed as a stem extending substantially in parallel with the gate line 121. The shape and arrangement of the sustain electrode line 131 may vary from one LCD device to another LCD device.

The sustain electrodes 135, 136, 137, and 138 may extend from the sustain electrode line 131. Some of the sustain electrodes 135, 136, 137, and 138, i.e., the sustain electrodes 135 and 136, may overlap with the first sub-pixel electrode 190a and may surround at least part of the first sub-pixel electrode 190a, and the other sustain electrodes, i.e., the sustain electrodes 137 and 138 may overlap with the second sub-pixel electrode 190b and may surround at least part of the second sub-pixel electrode 190b.

A gate insulating layer 140 may be formed on the gate line 121 and the sustain electrode line 131. A plurality of first and second semiconductors 151a and 151b may be formed on the gate insulating layer 140. The first and second semiconductors 151a and 151b may include protrusions 154a and 154b, respectively, which protrude toward gate electrodes 124a and 124b, respectively. The first and second semiconductors 151a and 151b may be formed of amorphous or crystalline silicon. That is, the first and second semiconductors 151a and 151b may be implemented as oxide semiconductors.

If the first and second semiconductors 151a and 151b are implemented as oxide semiconductors, resistive contact members 161a, 161b, 163a, 163b, 165a, and 165b may not be provided.

A pair of first and second data lines 171a and 171b and a pair of first and second drain electrodes 175a and 175b may be disposed on the resistive contact members 161a, 161b, 163a, 163b, 165a, and 165b and the gate insulating layer 140.

The first and second data lines 171a and 171b transmit a data signal. The first and second data lines 171a and 171b extend mostly in a vertical direction (a Y-axis direction) and intersect the gate line 121, thereby defining a pixel region. The first and second data lines 171a and 171b may also intersect the sustain electrode line 131.

The first and second data lines 171a and 171b may include first and second source electrodes 173a and 173b, respectively, which face the first and second gate electrodes 124a and 124b, respectively, and are U-shaped. The first and second source electrodes 173a and 173b may face the first and second drain electrodes 175a and 175b, respectively, with the first and second gate electrodes 124a and 124b interposed therebetween.

The first and second drain electrodes 175a and 175b may extend upwardly from first ends thereof, which are partially surrounded by the first and second source electrodes 173a and 173b, respectively. Second ends of the first and second drain electrodes 175a and 175b may be relatively wider than the first ends of the first and second drain electrodes 175a and 175b for being connected to other layers.

The shapes and arrangements of the first and second data lines 171a and 171b and the first and second drain electrodes 175a and 175b may vary.

The first gate electrode 124a, the first source electrode 173a, and the first drain electrode 175a may form a first TFT Qa of FIG. 1, together with the protrusion 154a of the first semiconductor 151a. The second gate electrode 124b, the second source electrode 173b, and the second drain electrode 175b may form a second TFT Qb of FIG. 1, together with the protrusion 154b of the second semiconductor 151b. The channel of the first TFT Qa may be formed in the protrusion 154a of the first semiconductor 151a, between the first source electrode 173a and the first drain electrode 175a. The channel of the second TFT Qb may be formed in the protrusion 154b of the second semiconductor 151b, between the second source electrode 173b and the second drain electrode 175b.

The resistive contact members 161a, 161b, 163a, 163b, 165a, and 165b may be disposed between the protrusions 154a and 154b of the first and second semiconductors 151a and 151b and the first and second data lines 171a and 171b, and may lower the contact resistance therebetween. Parts of the first and second semiconductors 151a and 151b, such as parts between the first source electrode 173a and the first drain electrode 175a, and between the second source electrode 173b and the second drain electrode 175b, are not covered with the first and second data lines 171a and 171b and the first and second drain electrodes 175a and 175b, but are exposed.

The resistive contact members 161a, 161b, 163a, 163b, 165a, and 165b, the first and second data lines 171a and 171b, including the first and second source electrodes 173a and 173b, and the first and second drain electrodes 175a and 175b may have the same planar patterns, and may have substantially the same planar patterns as the first and second semiconductors 151a and 151b except for the exposed parts of the first and second semiconductors 151a and 151b between the first source electrode 173a and the first drain electrode 175a and between the second source electrode 173b and the second drain electrode 175b.

A first passivation layer 180p may be disposed on the first and second data lines 171a and 171b, the first and second drain electrodes 175a and 175b and the exposed parts of the first and second semiconductors 151a and 151b. The first passivation layer 180p may be formed of silicon nitride or silicon oxide.

More specifically, the first passivation layer 180p may be formed of an inorganic material.

Color filters 230 may be formed on the first passivation layer 180p. The first passivation layer 180p may prevent pigments from the color filters 230 from infiltrating into the exposed parts of the first and second semiconductors 151a and 151b. Alternatively, the color filters 230 may be formed on the second display panel 200.

An upper passivation layer 180q may be formed on the color filters 230. The upper passivation layer 180q may be formed of an inorganic material.

The upper passivation layer 180q may prevent the color filters 230 from being detached, may prevent the liquid crystal layer 3 from being polluted with organic materials such as a solvent from the color filters 230, and may prevent defects such as afterimages from occurring.

A pixel electrode (190a, 190b) may be provided on the upper passivation layer 180q. The pixel electrode (190a, 190b) may overlap with the first data line 171a at one side thereof, and may overlap with the second data line 171b at the other side thereof. The width, along the X-axis direction, of the first data line 171a may be substantially the same as the overlapping width, along the X-axis direction, of the pixel electrode (190a, 190b) and the first data line 171a. The width, along the X-axis direction, of the second data line 171b may be substantially the same as the overlapping width, along the X-axis direction, of the pixel electrode (190a, 190b) and the second data line 171b.

For example, as illustrated in FIG. 4, a width Wb, along the X-axis direction, of the second data line 171b may be substantially the same as an overlapping width Wo, along the X-axis direction, of the second sub-pixel electrode 190b and the second data line 171b.

The pixel electrode (190a, 190b) may include the first and second sub-pixel electrodes 190a and 190b, which are isolated from each other.

Each of the first and second sub-pixel electrodes 190a and 190b may include at least one horizontal stem and a plurality of branches connected to, and extended from, the horizontal stem. The horizontal stem may extend in a direction intersecting the first data line 171a or the second data line 171b, i.e., a direction intersecting the Y-axis direction. In an exemplary embodiment, the horizontal stem may extend in a direction parallel with the gate line 121, i.e., the X-axis direction.

The branches may form a predetermined angle with the horizontal stem or the gate line 121. The branches may form an angle of about ±45 degrees or about ±135 degrees with the horizontal stem or the gate line 121.

In the present exemplary embodiment, as illustrated in FIG. 5, the first sub-pixel electrode 190a may include a first part P1, a second part P2, which is isolated from the first part P1 by a gap Sa therebetween, and a connecting portion 199a, which connects the first part P1 and the second part P2. The second sub-pixel electrode 190b may include a third part P3, a fourth part P4, which is isolated from the third part P3 by a gap Sb therebetween, and a connecting portion 199b, which connects the third part P3 and the fourth part P4.

The first sub-pixel electrode 190 will hereinafter be described in further detail.

The first part P1 may include a first horizontal stem 191a, a first vertical stem 192a, a plurality of first upper branches 193a, and a plurality of first lower branches 194a.

The first horizontal stem 191a may extend in a direction intersecting the first data line 171a or the second data line 171b, i.e., a direction intersecting the Y-axis direction. In an exemplary embodiment, the first horizontal stem 191a may extend in a direction parallel with the gate line 121, i.e., the X-axis direction.

The first vertical stem 192a may be provided at one end of the first horizontal stem 191a, and may intersect the gate line 121. The first vertical stem 192a may extend both upwardly and downwardly from the first horizontal stem 191a.

The first upper branches 193a may be separated from one another by gaps. The first upper branches 193a may have first ends connected to the first horizontal stem 191a, and may extend upwardly from the first ends to second ends thereof. Some of the first upper branches 193a may have first ends connected to the first vertical stem 192a, and may extend upwardly from the first ends to second ends thereof. The first upper branches 193a may extend upwardly to the right. The lengthwise direction of the first upper branches 193a may form a predetermined angle of, for example, about 45 degrees, with the lengthwise direction of the first horizontal stem 191a.

The first lower branches 194a may be separated from one another by gaps. The first lower branches 194a may have first ends connected to the first horizontal stem 191a, and may extend downwardly from the first ends to second ends thereof. In an exemplary embodiment, the first lower branches 194a may extend downwardly to the right. In an exemplary embodiment, some of the first lower branches 194a may have first ends connected to the first vertical stem 192a, and may extend downwardly from the first ends to second ends thereof. The lengthwise direction of the first lower branches 194a may form a predetermined angle of, for example, about −45 degrees, with the lengthwise direction of the first horizontal stem 191a.

The first upper branches 193a and the first lower branches 194a may be symmetrical with each other with respect to the lengthwise direction of the first horizontal stem 191a.

The second part P2 may include a second horizontal stem 195a, a second vertical stem 196a, a plurality of second upper branches 197a and a plurality of second lower branches 198a.

The second horizontal stem 195a may extend in a direction intersecting the first data line 171a or the second data line 171b, i.e., a direction intersecting the Y-axis direction. The second horizontal stem 195a may extend in a direction parallel with the gate line 121, i.e., the X-axis direction.

The second vertical stem 196a may be provided at one end of the second horizontal stem 195a, and may intersect the gate line 121. The second vertical stem 196a may extend both upwardly and downwardly from the second horizontal stem 195a. In consideration of the first vertical stem 192a being provided at the end of the first horizontal stem 191a near the first data line 171a, the second vertical stem 196a may be provided at the end of the second horizontal stem 195a near the second data line 171b.

The second upper branches 197a may be separated from one another by gaps. The second upper branches 197a may have first ends connected to the second horizontal stem 195a, and may extend upwardly from the first ends to second ends thereof. Some of the second upper branches 197a may have first ends connected to the second vertical stem 196a, and may extend upwardly from the first ends to second ends thereof. The second upper branches 197a may extend upwardly to the left. The lengthwise direction of the second upper branches 197a may form a predetermined angle of, for example, about 135 degrees, with the lengthwise direction of the second horizontal stem 195a.

The second lower branches 198a may be separated from one another by gaps. The second lower branches 198a may have first ends connected to the second horizontal stem 195a, and may extend downwardly from the first ends to second ends thereof. The second lower branches 198a may extend downwardly to the right. Some of the first lower branches 194a may have first ends connected to the second vertical stem 196a, and may extend downwardly from the first ends to second ends thereof. The lengthwise direction of the second lower branches 198a may form a predetermined angle of, for example, about −135 degrees, with the lengthwise direction of the second horizontal stem 195a.

The second upper branches 197a and the second lower branches 198a may be symmetrical with each other with respect to the lengthwise direction of the second horizontal stem 195a.

The first part P1 may overlap with the first data line 171a at one side thereof, and may overlap with the second data line 171b at the other side thereof.

An overlapping area A1a of the first part P1 and the first data line 171a may differ from an overlapping area A1b of the first part P1 and the second data line 171b. The overlapping area A1a may be larger than the overlapping area A1b.

Similarly, an overlapping area A2a of the second part P2 and the first data line 171a may differ from an overlapping area A2b of the second part P2 and the second data line 171b. The overlapping area A2a may be smaller than the overlapping area A2b.

The overlapping areas A1a, A2a, A1b, and A2b may satisfy the following equation: A1a+A2a=A1b+A2b.

The first part P1 and the second part P2 may be connected together by the first connecting portion 199a. The first connecting portion 199a may connect the first lower branches 194a and the second upper branches 197a, as illustrated in FIG. 5. Alternatively, the first connecting portion 199a may connect the first lower branches 194a and the second vertical stem 196a or may connect the second upper branches 197a and the first vertical stem 192a. The location and quantity of the first connecting portion 199a may vary.

The second sub-pixel electrode 190b will hereinafter be described.

The third part P3, similarly to the first part P1, may include a third horizontal stem 191b, a third vertical stem 192b, a plurality of third upper branches 193b and a plurality of third lower branches 194b. The third horizontal stem 191b, the third vertical stem 192b, the third upper branches 193b and the third lower branches 194b are substantially the same as, the first horizontal stem 191a, the first vertical stem 192a, the first upper branches 193a and the first lower branches 194a, respectively, and thus, detailed descriptions thereof will be omitted.

The fourth part P4, similarly to the second part P2, may include a fourth horizontal stem 195b, a fourth vertical stem 196b, a plurality of fourth upper branches 197b and a plurality of fourth lower branches 198b. The fourth horizontal stem 195b, the fourth vertical stem 196b, the fourth upper branches 197b and the fourth lower branches 198b are substantially the same as the second horizontal stem 195a, the second vertical stem 196a, the second upper branches 197a and the second lower branches 198a, respectively, and thus, detailed descriptions thereof will be omitted.

The third part P3 may overlap with the first data line 171a at one side thereof, and may overlap with the second data line 171b at an opposing side thereof.

An overlapping area A3a of the third part P3 and the first data line 171a may differ from an overlapping area A3b of the third part P3 and the second data line 171b. For example, the overlapping area A3a may be larger than the overlapping area A3b.

Similarly, an overlapping area A4a of the fourth part P4 and the first data line 171a may differ from an overlapping area A4b of the fourth part P4 and the second data line 171b. For example, the overlapping area A4a may be smaller than the overlapping area A4b.

The overlapping areas A3a, A4a, A3b, and A4b may satisfy the following equation: A3a+A4a=A3b+A4b.

The third part P3 and the fourth part P4 may be connected together by the second connecting portion 199b. The second connecting portion 199b may connect some of the third lower branches 194b and the fourth upper branches 197b, as illustrated in FIG. 5. However, the location and quantity of the second connecting portion 199b may vary.

Since each sub-pixel electrode of the LCD device according to the present exemplary embodiment includes a horizontal stem, a plurality of upper branches extended upwardly from the horizontal stem, and a plurality of lower branches extended downwardly from the horizontal stem, it is possible to effectively control texture, even if the LCD device is implemented as a curved LCD device.

Referring back to FIGS. 2 to 4, the area of the second sub-pixel electrode 190b may be larger than the area of the first sub-pixel electrode 190a. The area of the second sub-pixel electrode 190b may be about 1.0 to about 2.5 times larger than the area of the first sub-pixel electrode 190a. However, the shape and the area ratio of the first and second sub-pixel electrodes 190a and 190b may vary.

The first and second sub-pixel electrodes 190a and 190b may be isolated from each other with the gate line 121 therebetween. In a plan view, the first sub-pixel electrode 190a may be disposed above the gate line 121, and the second sub-pixel electrode 190b may be disposed below the gate line 121.

The first sub-pixel electrode 190a may be isolated from the gate line 121 in a plan view, and the gap between the first sub-pixel electrode 190a and the gate line 121 may have a width of about 2 μm to about 7 μm. When a relatively high voltage is applied to the first sub-pixel electrode 190, the first sub-pixel electrode 190a may be isolated from the gate line 121. Accordingly, it is possible to reduce the generation of unnecessary capacitance between the first sub-pixel electrode 190a and the gate line 121, and thus, a kickback voltage may be lowered.

The first and second sub-pixel electrodes 190a and 190b may be physically and electrically connected to the first and second drain electrodes 175a and 175b, respectively, via contact holes 185a and 185b, respectively, and may receive a data voltage from the first and second drain electrodes 175a and 175b, respectively.

The pixel electrode (190a, 190b) may be formed in various planar patterns. The pixel electrode (190a, 190b)

may include the first and second sub-pixel electrodes 190a and 190b. The first and second sub-pixel electrodes 190a and 190b may be connected to the first and second drain electrodes 175a and 175b, respectively, as illustrated in FIGS. 2 to 4. Alternatively, the pixel electrode (190a, 190b) may be formed in one body, and may be connected to a single drain electrode.

An alignment layer 11 may be formed on the pixel electrode (190a, 190b). The alignment layer 11 may be a vertical alignment layer. The alignment layer 11 may include a photo-reactive material, and particularly, a reactive mesogen.

The second display panel 200 will hereinafter be described.

A light-blocking member 220 may be formed on a second substrate 210, which is formed of an insulating material such as transparent glass or a plastic material. The light-blocking member 220 is referred to as a black matrix, and prevents leakage of light.

The light-blocking member 220 may face the pixel electrode (190a, 190b), and may include a plurality of openings (not illustrated) having almost the same shape as the pixel electrode (190a, 190b). The light-blocking member 220 may prevent light from leaking from the pixel electrode (190a, 190b). The light-blocking member 220 may include parts corresponding to the gate line 121 and the first and second data lines 171a and 171b and parts corresponding to a TFT.

An overcoat layer 250 may be formed on the light-blocking member 220. The overcoat layer 250 may be formed of an organic insulating material, and may provide a flat surface. The overcoat layer 250 is optional.

A common electrode 270 may be formed on the overcoat layer 250. The common electrode 270 may be formed of a transparent conductive material such as indium tin oxide (ITO) or indium zinc oxide (IZO).

The common electrode 270 may be formed on the second display panel 200. Alternatively, the common electrode 270 may be formed on the first display panel where a plurality of signal lines and a plurality of pixels PX connected to the signal lines are formed.

An alignment layer 21 may be formed on the common electrode 270. The alignment layer 21 may be a vertical alignment layer. The alignment layer 21 may include a photo-reactive material.

A polarizer (not illustrated) may be disposed on the outside of the first and second display panels 100 and 200.

The liquid crystal layer 3 may be disposed between the first and second display panel 100 and 200. The liquid crystal layer 3 may include liquid crystal molecules 13 having a negative dielectric anisotropy. The liquid crystal molecules 31 are pretilted substantially in parallel to the lengthwise direction of the branches of each of the first and second sub-pixel electrodes 190a and 190b, and may be aligned to be perpendicular to the surfaces of the first and second display panels 100 and 200. The liquid crystal layer 3, the alignment layers 11 and 21 of the first and second display panels 100 and 200, or both may include a photo-reactive material, and due to the presence of the photo-reactive material, the liquid crystal molecules 31 may be able to be pretilted substantially in parallel to the lengthwise direction of the branches of each of the first and second sub-pixel electrodes 190a and 190b.

In response to a gate signal being applied to the gate line 121, a data voltage may be applied to the first and second sub-pixel electrodes 190a and 190b through the first and second data lines 171a and 171b, and the first and second sub-pixel electrodes 190a and 190b may generate an electric field, which is to be provided to the liquid crystal layer 3, together with the common electrode 270, which receives a common voltage. The sides of the branches of each of the first and second sub-pixel electrodes 190a and 190b may distort the electric field, and may generate components that are horizontal with respect thereto. The liquid crystal molecules 31 may be tilted in a direction determined by the horizontal components. In response to the generation of the electric field, the liquid crystal molecules 31 may be tilted first in a vertical direction with respect to the sides of the branches of each of the first and second sub-pixel electrodes 190a and 190b. Then, since there are horizontal components of the electric field and there are only narrow gaps among the branches of each of the first and second sub-pixel electrodes 190a and 190b, the liquid crystal molecules 31 may be tilted in parallel to the lengthwise direction of the branches of each of the first and second sub-pixel electrodes 190a and 190b.

Since the branches of each of the first and second sub-pixel electrodes 190a and 190b extend in various directions, the liquid crystal molecules 31 may be tilted in various directions. By diversifying the tilt angle of the liquid crystal molecules 31, the basic viewing angle of the LCD device according to the present exemplary embodiment may be widened.

Since the first and second sub-pixel electrodes 190a and 190b overlap with the first and second data lines 171a and 171b, respectively, any texture variations that may occur along the sides of the pixel electrode (190a, 190b) may be shifted toward the first and second data lines 171a and 171b where images are rarely displayed. That is, the liquid crystal molecules 31 may be stably aligned in parts of a pixel region near the first and second data lines 171a and 171b, and as a result the texture in these parts of the pixel region may become regular. Accordingly, it is possible to reduce the occurrence of irregular texture and prevent the display quality from deteriorating due to texture variations.

The first and second sub-pixel electrodes 190a and 190b may be provided with different data voltages via the first and second data lines 171a and 171b, respectively. The data voltage applied to the first sub-pixel electrode 190a, which has a smaller area than the second sub-pixel electrode 190b, may be higher than the data voltage applied to the second sub-pixel electrode 190b.

In response to the data voltage applied to the first sub-pixel electrode 190a being different from the data voltage applied to the second sub-pixel electrode 190b, different voltages may be applied to the liquid crystal capacitors Clca and Clcb, which are formed by the first and second sub-pixel electrodes 190a and 190b, respectively. Accordingly, the tilt angle of the liquid crystal molecules 31 may vary from the sub-pixel PXa to the sub-pixel PXb. Therefore, by appropriately adjusting the data voltages applied to the first and second sub-pixel electrodes 190a and 190b, an image that can be viewed from a side of the LCD display device according to the present exemplary embodiment may become as similar as possible to an image that can be viewed in front of the LCD display device, and as a result, the lateral visibility of the LCD device according to the present exemplary embodiment may be improved.

Although certain exemplary embodiments and implementations have been described herein, other embodiments and modifications will be apparent from this description. Accordingly, the present invention is not limited to such embodiments, but rather to the broader scope of the presented claims and various obvious modifications and equivalent arrangements.

What is claimed is:

1. A liquid crystal display device, comprising:
a first substrate;
a gate line disposed on the first substrate;
a data line disposed on the first substrate and intersecting the gate line; and
a pixel electrode disposed in a pixel region at least partially defined by the gate line and the data line, and overlapping the data line, the pixel electrode comprising first and second sub-pixel electrodes separated from each other,
wherein each of the first and second sub-pixel electrodes comprises:
a horizontal stem extending in a direction intersecting the data line; and
branches connected to the horizontal stem, and
wherein a width of the data line is substantially the same as a width of overlapping areas of the pixel electrode and the data line.

2. The liquid crystal display device of claim 1, wherein:
the first and second sub-pixel electrodes are separated from each other; and
the gate line is disposed between the first and second sub-pixel electrodes.

3. A liquid crystal display device, comprising:
a first substrate;
a gate line disposed on the first substrate;
a data line disposed on the first substrate and intersecting the gate line; and
a pixel electrode disposed in a pixel region at least partially defined by the gate line and the data line, and overlapping the data line, the pixel electrode comprising first and second sub-pixel electrodes separated from each other,
wherein each of the first and second sub-pixel electrodes comprises:
a horizontal stem extending in a direction intersecting the data line; and
branches connected to the horizontal stem, and
wherein each of the first and second sub-pixel electrodes overlaps the data line.

4. A liquid crystal display device, comprising:
a first substrate;
a gate line disposed on the first substrate;
a data line disposed on the first substrate and intersecting the gate line; and
a pixel electrode disposed in a pixel region at least partially defined by the gate line and the data line, and overlapping the data line, the pixel electrode comprising first and second sub-pixel electrodes separated from each other,
wherein each of the first and second sub-pixel electrodes comprises:
a horizontal stem extending in a direction intersecting the data line; and
branches connected to the horizontal stem, and
wherein the first sub-pixel electrode comprises:
a first horizontal stem extending in a direction intersecting the data line;
first branches connected to the first horizontal stem;
a second horizontal stem extending in a direction intersecting the data line;
second branches connected to the second horizontal stem; and
a first connecting portion connecting at least one of the first and second branches.

5. The liquid crystal display device of claim 4, wherein the first sub-pixel electrode further comprises:
a first vertical stem connected to a first end of the first horizontal stem and extending in a direction intersecting the gate line; and
a second vertical stem connected to a second end of the second horizontal stem and extending in a direction intersecting the gate line.

6. The liquid crystal display device of claim 4, wherein the second sub-pixel electrode comprises:
a third horizontal stem extending in a direction intersecting the data line;
third branches connected to the third horizontal stem;
a fourth horizontal stem extending in a direction intersecting the data line;
fourth branches connected to the fourth horizontal stem; and
a second connecting portion connecting at least one of the third and fourth branches.

7. The liquid crystal display device of claim 6, wherein the second sub-pixel electrode further comprises:
a third vertical stem connected to a first end of the third horizontal stem and extending in a direction intersecting the gate line; and
a fourth vertical stem connected to a second end of the fourth horizontal stem and extending in a direction intersecting the gate line.

8. A liquid crystal display device, comprising:
a first substrate;
a gate line disposed on the first substrate;
a first data line and a second data line disposed on the first substrate, insulated from the gate line, and intersecting the gate line;
a first thin-film transistor (TFT) connected to the gate line and the first data line;
a second TFT connected to the gate line and the second data line;
a pixel electrode comprising first and second sub-pixel electrodes connected to the first and second TFTs, respectively;
a second substrate facing the first substrate;
a common electrode disposed on the second substrate; and
a liquid crystal layer disposed between the first and second substrates,
wherein:
a first side of the pixel electrode overlaps the first data line, and a second side of the pixel electrode overlaps the second data line;
a width of the first data line is substantially the same as a width of overlapping areas of the pixel electrode and the first data line; and
a width of the second data line is substantially the same as a width of overlapping areas of the pixel electrode and the second data line.

9. The liquid crystal display device of claim 8, further comprising color filters disposed on the first and second TFTs,
wherein the pixel electrode is disposed on the color filters.

10. The liquid crystal display device of claim 8, wherein:
the first and second sub-pixel electrodes are separated from each other; and
the gate line is disposed between the first and second sub-pixel electrodes.

11. The liquid crystal display device of claim 8, wherein each of the first and second sub-pixel electrodes comprises:
a horizontal stem extending in a direction intersecting the first or second data line; and
branches connected to the horizontal stem.

12. A liquid crystal display device, comprising:
a first substrate;
a gate line disposed on the first substrate;

a first data line and a second data line disposed on the first substrate, insulated from the gate line, and intersecting the gate line;

a first thin-film transistor (TFT) connected to the gate line and the first data line;

a second TFT connected to the gate line and the second data line;

a pixel electrode comprising first and second sub-pixel electrodes connected to the first and second TFTs, respectively;

a second substrate facing the first substrate;

a common electrode disposed on the second substrate; and a liquid crystal layer disposed between the first and second substrates, wherein:

a first side of the pixel electrode overlaps the first data line, and a second side of the pixel electrode overlaps the second data line; and each of the first and second sub-pixel electrodes overlaps with the first data line at a first side thereof and overlaps with the second data line at a second side thereof.

13. A liquid crystal display device, comprising:

a first substrate;

a gate line disposed on the first substrate;

a first data line and a second data line disposed on the first substrate, insulated from the gate line, and intersecting the gate line;

a first thin-film transistor (TFT) connected to the gate line and the first data line;

a second TFT connected to the gate line and the second data line;

a pixel electrode comprising first and second sub-pixel electrodes connected to the first and second TFTs, respectively;

a second substrate facing the first substrate;

a common electrode disposed on the second substrate; and a liquid crystal layer disposed between the first and second substrates, wherein:

a first side of the pixel electrode overlaps the first data line, and a second side of the pixel electrode overlaps the second data line; and the first sub-pixel electrode comprises:

a first horizontal stem extending in a direction intersecting the first or second data line;

first branches connected to the first horizontal stem;

a second horizontal stem extending in a direction intersecting the first or second data line;

second branches connected to the second horizontal stem; and a first connecting portion connecting at least one of the first and second branches.

14. The liquid crystal display device of claim 13, wherein:

each of the first and second parts overlaps with the first data line at a first side thereof and overlaps with the second data line at a second side thereof; and an overlapping area of the first part and the first data line differs from an overlapping area of the first part and the second data line.

15. The liquid crystal display device of claim 13, wherein the first sub-pixel electrode further comprises:

a first vertical stem connected to a first end of the first horizontal stem and extending in a direction intersecting the gate line; and a second vertical stem connected to a second end of the second horizontal stem and extending in a direction intersecting the gate line.

16. The liquid crystal display device of claim 13, wherein the second sub-pixel electrode comprises:

a third horizontal stem extending in a direction intersecting the data line;

third branches connected to the third horizontal stem;

a fourth horizontal stem extending in a direction intersecting the data line;

fourth branches connected to the fourth horizontal stem; and a second connecting portion connecting at least one of the third and fourth branches.

17. The liquid crystal display device of claim 16, wherein:

each of the first and second parts overlaps with the first data line at a first side thereof and overlaps with the second data line at a second side thereof; and an overlapping area of the first part and the first data line differs from an overlapping area of the first part and the second data line.

18. The liquid crystal display device of claim 16, wherein the second sub-pixel electrode further comprises:

a third vertical stem connected to a first end of the third horizontal stem and extending in a direction intersecting the gate line; and a fourth vertical stem connected to a second end of the fourth horizontal stem and extending in a direction intersecting the gate line.

* * * * *